US007339020B2

(12) United States Patent
Bruchmann et al.

(10) Patent No.: US 7,339,020 B2
(45) Date of Patent: Mar. 4, 2008

(54) HIGH-FUNCTIONALITY POLYISOCYANATES

(75) Inventors: Bernd Bruchmann, Freinsheim (DE); Hans Renz, Meckenheim (DE); Rainer Königer, Freinsheim (DE); Ulrike Ehe, Lambsheim (DE); Ulrich Treuling, Bensheim (DE); Rudolf Müller-Mall, Neuhofen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/811,987

(22) Filed: Mar. 19, 2001

(65) Prior Publication Data
US 2002/0007036 A1    Jan. 17, 2002

(30) Foreign Application Priority Data
Mar. 17, 2000  (DE) ............................... 100 13 187

(51) Int. Cl.
*C08G 18/10*    (2006.01)
*C08G 18/72*    (2006.01)
*C08J 9/04*     (2006.01)
*C07C 269/02*   (2006.01)
*C07C 271/06*   (2006.01)

(52) U.S. Cl. .................. 528/59; 252/182.22; 521/155; 521/159; 521/160; 528/67; 528/73; 528/76; 528/77; 528/80; 528/81; 528/85; 544/222; 560/25; 560/26; 560/115; 560/158; 560/330; 560/336; 560/355; 560/358; 560/359; 560/360; 564/32; 564/47; 564/48; 564/57

(58) Field of Classification Search .................. 560/25, 560/26, 115, 158, 330, 336, 355, 358, 359, 560/360; 564/32, 47, 48, 57; 528/59, 67, 528/73, 76, 77, 80, 81, 85; 252/182.22; 521/155, 521/159, 160; 544/222
See application file for complete search history.

(56) References Cited

U.S. PATENT DOCUMENTS 4,623,709 A    11/1986  Bauriedel ..................... 528/65
5,744,569 A    4/1998   Bruchmann et al. .......... 528/73
5,981,684 A *  11/1999  Bruchmann et al. .......... 528/45
6,416,686 B2 * 7/2002   Bruchmann et al. ... 252/182.22
6,515,164 B1 * 2/2003   Bolte et al. .................... 560/25
6,632,914 B2 * 10/2003  Bruchmann et al. .......... 528/59

FOREIGN PATENT DOCUMENTS

| EP | 0150444 A2 | 8/1985 |
| EP | 0752433 A2 | 1/1997 |
| EP | 0780413 A1 | 6/1997 |
| EP | 1026185 A1 | 8/2000 |
| EP | 1054030    | * 11/2000 |
| WO | 98/29466   | * 7/1998 |

* cited by examiner

*Primary Examiner*—Rabon Sergent
(74) *Attorney, Agent, or Firm*—Fernando A. Borrego

(57) ABSTRACT

High-functionality polyisocyanates are prepared by a process which comprises
(i) preparation of an addition product (A) which contains one group which is reactive toward isocyanate and at least two isocyanate groups by reacting
  (a) a diisocyanate or polyisocyanate I with
  (b1) compounds having at least three groups which are reactive toward isocyanate or
  (b2) compounds containing two groups which are reactive toward isocyanate or mixtures of (b1) and (b2),
where at least one of the components (a) or (b) has functional groups having differing reactivities toward the functional groups of the other component and the reaction ratio is selected so that the addition product (A) contains an average of one group which is reactive toward isocyanate,
(ii) if desired, intermolecular addition reaction of the addition product (A) to form a polyaddition product (P) containing an average of one group which is reactive toward isocyanate and an average of more than two isocyanate groups, and
(iii) reaction of the addition product (A) and/or the polyaddition product (P) with a diisocyanate or polyisocyanate II.

11 Claims, No Drawings

HIGH-FUNCTIONALITY POLYISOCYANATES

The present invention relates to high-functionality polyisocyanates based on two diisocyanates or polyisocyanates and built up in a defined way, and also to a process for preparing them.

High-functionality polyisocyanates can be advantageously used in industry as, inter alia, building blocks for polyurethane production, e.g. for producing paints and varnishes, coatings, adhesives, sealants, pourable elastomers or foams. However, their commercial availability is limited.

As far as high-functionality aromatic isocyanates are concerned, relatively high molecular weight isomers of diphenylmethane diisocyanate (MDI) whose functionalities are significantly above 3 are known. However, a disadvantage of these MDI compounds is that they can be isolated in pure form only with difficulty. In the preparation of commercial polymeric MDI, these high-functionality species are formed only in small amounts, so that they are always present in admixture with predominantly bifunctional monomeric MDI and trifunctional oligomeric MDI-type species. As a result, the overall functionality of the MDI mixture is significantly below 3.

In the case of aliphatic polyisocyanates, which are mainly used as crosslinkers for PU coating systems, the mean functionalities are generally in the range from 2 to 4. The preparation of higher-functionality aliphatic polyisocyanates is technically complicated and costly. These products are generally prepared by reaction of, for example, hexamethylene diisocyanate (HDI) or HDI trimer with a polyfunctional polyol. The products then contain urethane and/or allophanate groups, are highly viscous, have a low NCO content and are used, sometimes in NCO-blocked form, as moisture-curable single-component PU systems for paints, varnishes and coatings.

EP-A-336205 and DE-A-3621706 describe the preparation of high-viscosity products containing isocyanurate groups by trimerization of HDI and subsequent reaction with diols, polyester diols or polyester triols. A disadvantage here is the comparatively high viscosity of the products.

JP-A-6312969 describes the preparation of high-viscosity polyisocyanates having viscosities of 5000-100,000 mPas and functionalities of 4.5-10. These products are obtained by trimerization of HDI in the presence of a polyfunctional polyetherol or polyesterol. The products are used for preparing NCO-blocked polyisocyanates.

In the abovementioned documents, the high-functionality aliphatic molecular structures are built up in an uncontrolled and nonuniform way, since the reactions of trimerization of the isocyanate, urethane formation and allophanate formation proceed either in parallel or in succession.

It is an object of the present invention to provide polyisocyanates which are built up in a defined way and can, owing to their defined structure, combine advantageous properties such as high functionality, high reactivity, low viscosity and good solubility, and to provide a process for preparing these high-functionality polyisocyanates. A further object of the invention is to provide a process which allows the functionality of commercial, industrial diisocyanates or polyisocyanates to be increased by reaction to form high-functionality polyisocyanates.

We have found that these objects are achieved by reacting an addition product (A) and/or a polyaddition product (P) obtainable by reacting a diisocyanate or polyisocyanate I with a compound which is reactive toward isocyanate and has one group which is reactive toward isocyanate and at least two isocyanate groups with a diisocyanate or polyisocyanate II which is preferably different from the diisocyanate or polyisocyanate I.

The present invention accordingly provides a process for preparing high-functionality polyisocyanates, which comprises (i) preparation of an addition product (A) which contains one group which is reactive toward isocyanate and at least two isocyanate groups by reacting
  (a) a diisocyanate or polyisocyanate I with
  (b1) compounds having at least three groups which are reactive toward isocyanate or
  (b2) compounds containing two groups which are reactive toward isocyanate or mixtures of (b1) and (b2), where at least one of the components (a) or (b) has functional groups having differing reactivities toward the functional groups of the other component and the reaction ratio is selected so that the addition product (A) contains an average of one group which is reactive toward isocyanate, (ii) if desired, intermolecular addition reaction of the addition product (A) to form a polyaddition product (P) containing an average of one group which is reactive toward isocyanate and an average of more than two isocyanate groups, and (iii) reaction of the addition product (A) and/or the polyaddition product (P) with a diisocyanate or polyisocyanate II, where the diisocyanate or polyisocyanate I is preferably different from the diisocyanate or polyisocyanate II.

The invention further provides the high-functionality polyisocyanates prepared by this process.

The invention also provides for the use of the high-functionality polyisocyanates of the present invention as building blocks, for producing paints and varnishes, coatings, adhesives, sealants, pourable elastomers or foams and provides polyaddition products obtainable using the high-functionality polyisocyanates of the present invention.

For the purposes of the present invention, a high-functionality polyisocyanate is a polyisocyanate which contains at least three, preferably at least five, more preferably at least six, free isocyanate groups. In principle, the number of isocyanate groups has no upper limit, but polyisocyanates having a very large number of isocyanate groups can have undesirable properties, for example high viscosity or poor solubility. The high-functionality polyisocyanates of the present invention usually have no more than 100 isocyanate groups, preferably no more than 50 isocyanate groups.

Possible diisocyanates and polyisocyanates I are the aliphatic, cycloaliphatic and aromatic isocyanates known from the prior art. Preferred diisocyanates or polyisocyanates I are diphenylmethane 4,4'-diisocyanate, mixtures of monomeric diphenylmethane diisocyanates and higher homologues of diphenylmethane diisocyanate (polymeric MDI), tetramethylene diisocyanate, tetramethylene diisocyanate trimers, hexamethylene diisocyanate, hexamethylene diisocyanate trimers, isophorone diisocyanate trimer, dicyclohexylmethane 4,4'-diisocyanate, xylylene diisocyanate, tetramethylxylylene diisocyanate, dodecyl diisocyanate, lysine alkyl ester diisocyanate, where alkyl is $C_1$-$C_{10}$-alkyl, 2,2,4- or 2,4,4-trimethylhexamethylene 1,6-diisocyanate, 1,4-diisocyanatocyclohexane, 1,3- or 1,4-bis(isocyanatomethyl)cyclohexane and 4-isocyanatomethyloctamethylene 1,8-diisocyanate.

Particular preference is given to diisocyanates or polyisocyanates having NCO groups of differing reactivity, e.g. tolylene 2,4-diisocyanate (2,4-TDI), diphenylmethane 2,4'- diisocyanate (2,4'-MDI), triisocyanatotoluene, isophorone diisocyanate (IPDI), 2-butyl-2-ethylpentamethylene diisocyanate, 2-isocyanatopropylcyclohexyl isocyanate, 3(4)-isocyanatomethyl-1-methylcyclohexyl isocyanate, 1,4-diisocyanato-4-methylpentane, dicyclohexylmethane 2,4'-diisocyanate and 4-methylcyclohexane 1,3-diisocyanate (H-TDI).

Particular preference is also given to isocyanates whose NCO groups initially have the same reactivity but in which addition of an alcohol, mercaptan or amine onto a first NCO group induces a decrease in the reactivity of the second NCO group. Examples of such isocyanates are isocyanates whose NCO groups are coupled via a delocalized electron system, e.g. phenylene 1,3- and 1,4-diisocyanate, naphthylene 1,5-diisocyanate, biphenyl diisocyanate, tolidine diisocyanate or tolylene 2,6-diisocyanate.

Diisocyanates and polyisocyanates II are all aliphatic, cycloaliphatic and aromatic isocyanates known from the prior art. Apart from the abovementioned diisocyanates and polyisocyanates, it is also possible to use, for example, oligoisocyanates or polyisocyanates which can be prepared from the diisocyanates or triisocyanates listed or mixtures thereof by coupling by means of urethane, allophanate, urea, biuret, uretdione, amide, isocyanurate, carbodiimide, uretonimine, oxadiazinetrione or iminooxadiazinedione structures.

As diisocyanates and polyisocyanates II, particular preference is given to using diphenylmethane 4,4'-diisocyanate, mixtures of diphenylmethane diisocyanates and higher homologues of diphenylmethane diisocyanate (polymeric MDI), phenylene 1,3- and 1,4-diisocyanate, 4-isocyanatomethyloctamethylene 1,8-diisocyanate, hexamethylene diisocyanate, oligomers of hexamethylene diisocyanate containing isocyanurate, uretdione, urethane, allophanate, iminooxadiazinedione or biuret groups, oligomers of MDI containing urethane, allophanate, carbodiimide or uretonimine groups or oligomers of TDI containing urethane, allophanate, carbodiimide or uretonimine groups. Both for the diisocyanates and polyisocyanates I and for the diisocyanates and polyisocyanates II, it is also possible to use mixtures of the isocyanates mentioned.

The compounds (b1) having at least three groups which are reactive toward isocyanate and compounds (b2) containing two groups which are reactive toward isocyanate used for preparing the addition product (A) are selected from among compounds which contain hydroxyl groups, mercapto groups or amino groups. Preference is given to hydroxyl and amino groups.

In a preferred embodiment, the compounds (b1) containing at least three groups which are reactive toward isocyanate comprise compounds having three or four groups which are reactive toward isocyanate or mixtures thereof.

Likewise, the addition product (A) can be prepared using compounds (b1) containing at least three groups which are reactive toward isocyanate and/or compounds (b2) containing two groups which reactive toward isocyanate which are selected from among the abovementioned functional groups or mixtures thereof and whose functional groups have differing reactivities toward NCO groups. Preference is here given to compounds having at least one primary and at least one secondary or tertiary hydroxyl group, at least one hydroxyl group and at least one mercapto group or at least one hydroxyl group and at least one amino group in the molecule, since the reactivity of the amino group is significantly higher than that of the hydroxyl group in the reaction with isocyanate.

Preference is also given to isocyanate-reactive compounds whose functional groups which are reactive toward isocyanate initially have the same reactivity but in which addition of at least one isocyanate induces a decrease in the reactivity of the remaining isocyanate-reactive groups as a result of steric or electronic effects. This is the case, for example, when using trimethylolpropane or pentaerythritol as component (b1).

Examples of compounds (b1) having at least three groups which are reactive toward isocyanate are glycerol, trimethylolmethane, trimethylolethane, trimethylolpropane, 1,2,4-butanetriol, tris(hydroxymethyl)aminomethane, tris(hydroxyethyl)aminomethane, 2-amino-1,3-propanediol, 2-amino-2-methyl-1,3-propanediol, diethanolamine, dipropanolamine, diisopropanolamine, ethanolpropanolamine, bis(aminoethyl)amine, bis(aminopropyl)amine, tris(aminoethyl)amine, tris(aminopropyl)amine, trisaminononane, pentaerythritol, bis(trimethylolpropane) or sugars such as glucose, trifunctional or tetrafunctional polyetherols or polyesterols. Among these, glycerol, trimethylolethane, trimethylolpropane, 1,2,4-butanetriol, pentaerythritol, diethanolamine, dipropanolamine and tris(hydroxymethyl) aminomethane are particularly preferred.

Examples of compounds (b2) having two groups which are reactive toward isocyanate are ethylene glycol, diethylene glycol, triethylene glycol, 1,2- and 1,3-propanediol, dipropylene glycol, tripropylene glycol, neopentyl glycol, 1,2-, 1,3- and 1,4-butanediol, 1,2-, 1,3- and 1,5-pentanediol, hexanediol, the neopentyl glycol ester of hydroxypivalic acid, propane-1,2-dithiol, butane-1,2-dithiol, mercaptoethanol, mercaptopropanol, mercaptobutanol, ethylenediamine, tolylenediamine, isophoronediamine, cysteamine, ethanolamine, N-methylethanolamine, propanolamine, isopropanolamine, 2-(butylamino)ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, aminopropanethiol and bifunctional polyetherols or polyesterols. Among these, 1,2-propanediol, 1,2- and 1,3-butanediol, ethanolamine, propanolamine, mercaptoethanol, 4-hydroxypiperidine and 1-hydroxyethylpiperazine are particularly preferred.

It is also possible to use mixtures of the compounds mentioned.

In the preparation of the addition product (A), it is necessary to set the ratio of diisocyanate or polyisocyanate I to compounds (b1) having at least three isocyanate-reactive groups or compounds (b2) having two isocyanate-reactive groups or mixtures of (b1) and (b2) so that the resulting addition product (A) contains an average of one isocyanate-reactive group and an average of at least two NCO groups.

For example, the reaction ratio in the preparation of the addition product (A) from a diisocyanate and a trihydric alcohol is 2:1, illustrated by the formula 1,

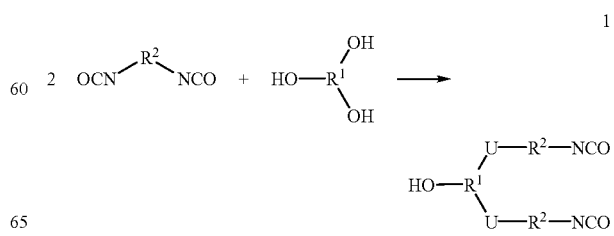

and the reaction ratio in the preparation of an addition product (A) from a diisocyanate and a tetrahydric alcohol is 3:1, illustrated by the formula 2,

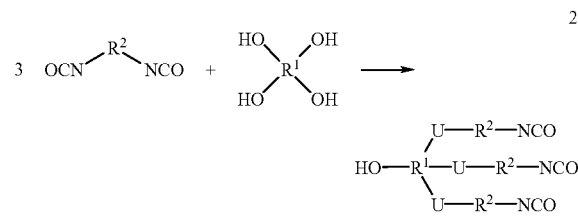

where, in the formulae 1 and 2, $R^1$ and $R^2$ are organic radicals and U is a urethane group.

The addition product (A) can also be prepared, for example, from a triisocyanate and a bifunctional component (b2) which is reactive toward isocyanate, illustrated by the formula 3, where the molar reaction ratio is 1:1, $R^1$ and $R^2$ are as defined for the formulae 1 and 2 and Y is, for example, a urea group.

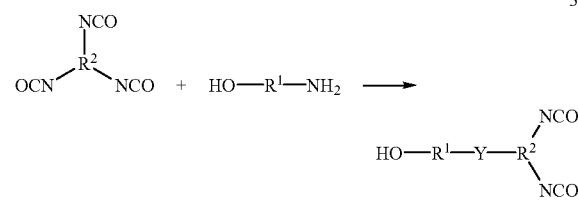

If compounds (b2) having two groups which are reactive toward isocyanate are additionally added to the component (b1), then this effects extension of the chains. As illustrated by way of example in the case of the formula 4, a further mole of diisocyanate or polyisocyanate I has to be added for each mole of the component (b2).

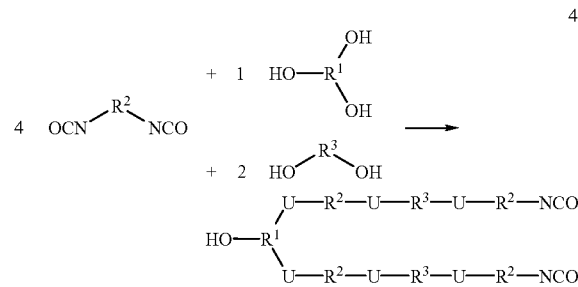

In formula 4, $R^3$ is an organic radical and $R^1$, $R^2$ and U are as defined above.

The reaction to form the addition product (A) is usually carried out at from −20 to 120° C., preferably from −10 to 100° C. In a preferred embodiment, the diisocyanate or polyisocyanate I is placed in the reaction vessel first and the component (b1) or (b2) or the mixture of (b1) and (b2) is added. The addition products (A) are usually not stable for a prolonged period and are therefore preferably reacted directly with the diisocyanate or polyisocyanate II.

In a preferred embodiment, the addition product (A) can be converted by means of an intermolecular addition reaction of the addition product (A) into a polyaddition product (P). Here, the isocyanate-reactive group of the addition product (A) adds onto one of the isocyanate groups of a further molecule of the addition product (A). The number of molecules of addition product (A) which are added together to form a polyaddition product (P) is generally not restricted. From a practical point of view, the addition reaction is usually stopped before the polyaddition product (P) has, for example owing to an excessively high molecular weight or for steric reasons, acquired disadvantageous properties such as an excessively high viscosity or an excessively poor solubility.

Owing to the nature of the addition products (A), it is possible for the addition reaction to result in various polyaddition products (P) which are branched but have no crosslinks. Furthermore, the polyaddition products (P) have one group which is reactive toward isocyanate and more than two isocyanate groups. The number of isocyanate groups is determined by the nature of the addition products (A) in question and the degree of polyaddition.

For example, an addition product (A) of the formula 1 can react by triple intermolecular addition to form two different polyaddition products (P) of the formulae 5 and 6.

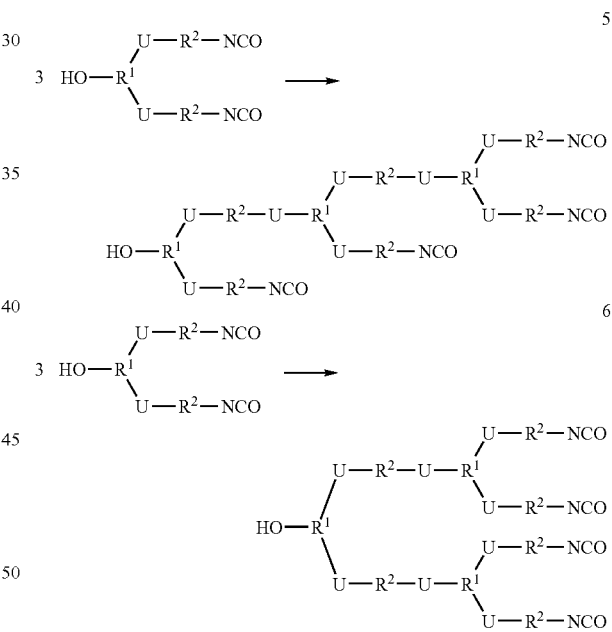

In the formulae 5 and 6, $R^1$, $R^2$ and U are as defined above.

The intermolecular polyaddition reaction of an addition product (A) to form a polyaddition product (P) can usually be carried out in situ after completion of the reaction to the addition product (A) by increasing the temperature.

Furthermore, a suitable catalyst or a suitable catalyst mixture can also be added. Suitable catalysts are generally compounds which catalyze the urethane reaction, for example amines, ammonium compounds, organic aluminum compounds, organic tin compounds, organic titanium compounds, organic zirconium compounds or organic bismuth compounds.

Examples which may be mentioned are diazabicyclooctane (DABCO), diazabicyclononene (DBN) and diazabicycloundecene (DBU), titanium tetrabutoxide, dibutyltin dilaurate, zirconium acetylacetonate and mixtures thereof.

The catalyst is generally added in an amount of from 50 to 10,000 ppm by weight, preferably from 100 to 5000 ppm by weight, based on the amount of isocyanate used.

Furthermore, it is also possible to control the intermolecular polyaddition reaction both by addition of a suitable catalyst and by selection of an appropriate temperature.

There are various ways of stopping the intermolecular polyaddition reaction. For example, the temperature can be reduced to a level at which the addition reaction ceases and the addition product (A) or the polyaddition product (P) is storage-stable.

In a preferred embodiment, a diisocyanate or polyisocyanate II is added to the polyaddition product (P) to stop the polyaddition reaction as soon as the polyaddition product (P) has the desired degree of polyaddition as a result of the intermolecular addition reaction of the addition product (A). Reaction of the polyaddition product (P) with the diisocyanate or polyisocyanate II gives the high-functionality polyisocyanates of the present invention.

If, for example, a diisocyanate II is added to a polyaddition product (P) of the formula 5 in a ratio of 2:1, a high-functionality polyisocyanate according to the present invention of the formula 7 can be obtained.

It is also possible to use the isocyanate-reactive components (b1) or (b2) in a small molar excess so as to bring about essentially complete reaction, of the isocyanate I. An advantage of both procedures is that a possibly complicated removal of unreacted isocyanate I is dispensed with.

In the reaction of the addition product (A) and/or the polyaddition product (P) with the diisocyanate or polyisocyanate II, it is usual for at least one isocyanate group of the diisocyanate or polyisocyanate II to be reacted with the isocyanate-reactive group of the addition product (A) or the polyaddition product (P). In a preferred embodiment, at least 10%, in particular at least 40% and particularly preferably 50-100%, of the free isocyanate groups of the diisocyanate or polyisocyanate II are reacted with a corresponding number of equivalents of an addition product (A) and/or polyaddition product (P) to give the high-functionality polyisocyanate of the present invention.

In a further embodiment, one isocyanate group of a diisocyanate or polyisocyanate II is firstly reacted with an addition product (A1) or a polyaddition product (P1), followed by reaction of at least one further isocyanate group of the diisocyanate or polyisocyanate II with an addition product (A2) or a polyaddition product (P2), where the addition products (A1) and (A2) or the polyaddition products (P1) and (P2) are not identical. In this embodiment, preference is given to using a diisocyanate or polyisocyanate II which has

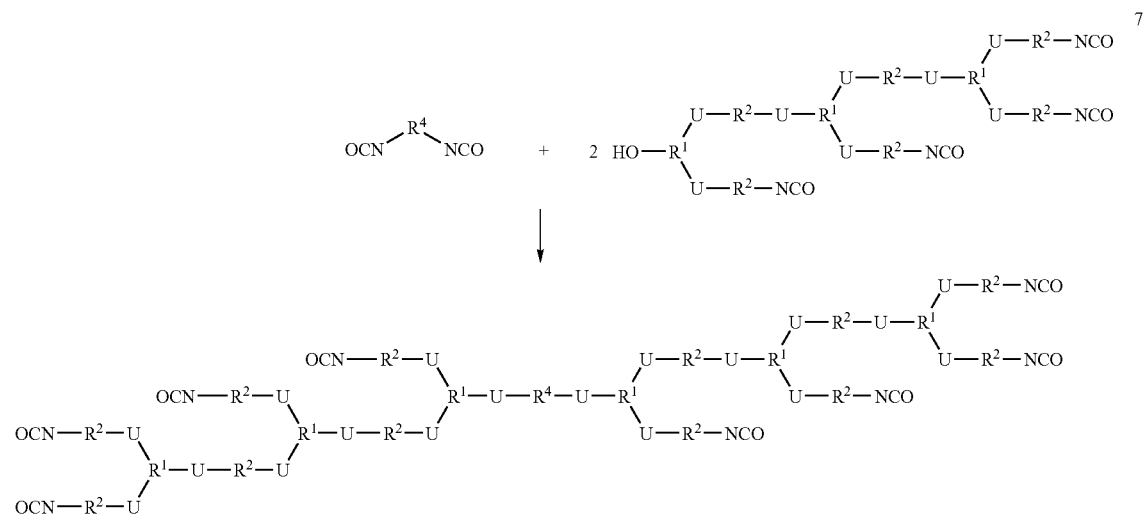

In formula 7, $R^1$, $R^2$ and U are as defined above and $R^4$ is an organic radical which is preferably not identical to $R^2$.

As an alternative, the diisocyanate or polyisocyanate II can also be added to an addition product (A) which has not yet been reacted in an intermolecular addition reaction to form a polyaddition product (P).

However, it is usually technically advantageous to carry out the intermolecular addition reaction to at least a small extent since small amounts of diisocyanate or polyisocyanate I may still be present as impurities in the addition product (A) and these impurities can then be incorporated into the polyaddition product (P) by means of the intermolecular polyaddition reaction.

isocyanate groups of differing reactivity toward the isocyanate-reactive groups of the components (A) and/or (P).

The preparation of the high-functionality polyisocyanates of the present invention is usually carried out in solvents. Here, it is generally possible to use all solvents which are inert toward the respective starting materials. Preference is given to using organic solvents such as diethyl ether, tetrahydrofuran, acetone, 2-butanone, methyl isobutyl ketone, ethyl acetate, butyl acetate, benzene, toluene, chlorobenzene, xylene, methoxyethyl acetate, methoxypropyl acetate, dimethylformamide, dimethylacetamide or solvent naphtha.

The preparation of the high-functionality polyisocyanates of the present invention is usually carried out in a pressure range from 2 mbar to 20 bar, preferably at atmospheric pressure, in reactors or reactor cascades which can be operated batchwise, semicontinuously or continuously.

The abovementioned setting of the reaction conditions and possibly the choice of a suitable solvent makes it possible for the products according to the present invention to be further processed after their production without further purification.

The high-functionality polyisocyanates obtained by the process of the present invention can, if required, also be made hydrophobic, be made hydrophilic or their functional groups can be modified. For this purpose the NCO-terminated products can be reacted or partially reacted with, for example, fatty alcohols, fatty amines, hydroxycarboxylic acids, hydroxysulfonic acids, amino acids or monoalcohols containing acrylate groups, e.g. hydroxyethyl acrylate or hydroxyethyl methacrylate.

The isocyanate groups of the high-functionality polyisocyanates of the present invention can also be present in capped form. Suitable capping agents for NCO groups are, for example, oximes, phenols, imidazoles, triazoles, pyrazoles, pyrazolinones, diketopiperazines, caprolactam, malonic esters or compounds as are mentioned in the publications by Z. W. Wicks, Prog. Org. Coat. 3 (1975), 73-99 and Prog. Org. Coat. 9 (1981), 3-28 and also Houben-Weyl, Methoden der Organischen Chemie, Volume XIV/2, 61 ff., Georg Thieme Verlag, Stuttgart 1963.

The present invention makes it possible to obtain the desired properties of the high-functionality polyisocyanates of the present invention by appropriate selection of the starting materials, particularly the diisocyanates or polyisocyanates I and II. Thus, the high-functionality polyisocyanates of the present invention can make it possible, for example, to combine positive properties of customary aromatic isocyanates with positive properties of customary aliphatic isocyanates or to combine the positive properties of customary aliphatic isocyanates with the positive properties of customary cycloaliphatic isocyanates.

If, for example, a high-functionality polyisocyanate according to the present invention is prepared from HDI isocyanurate oligomer as isocyanate II and TDI as isocyanate I, this polyisocyanate molecule can, depending on the choice of the amount of the isocyanate II, have both aromatic and aliphatic NCO groups which have significantly different reactivities. These different NCO reactivities within a polyisocyanate molecule can then be utilized advantageously in industry.

If, for example, a high-functionality polyisocyanate according to the present invention is prepared from HDI isocyanurate oligomer and IPDI or IPDI trimer, a PU coating composition produced using this polyisocyanate has both properties such as elasticity and flexibility and properties such as hardeners, scratch resistance and resistance to chemicals.

A further advantage of the present invention is that the functionalities of conventional, industrial isocyanates can be significantly increased. If, for example, a commercial polymeric MDI having a mean NCO functionality of 2.5 is reacted with an addition product (A) of two mole of 2,4-TDI and one mole of glycerol, the mean functionality of the resulting isocyanate is 5.

An advantage of the isocyanates having a high functionality is that the network is not built up randomly as usual, but instead structures having a defined composition and defined properties are built into the network.

A further advantage of the process of the present invention is the economical manner in which it can be carried out. Both the reaction of diisocyanate or polyisocyanate I to form an addition product (A) and/or polyaddition product (P) and the reaction of (A) or (P) with a diisocyanate or polyisocyanate II to give a high-functionality polyisocyanate can be carried out in one reaction apparatus, which is technically and economically advantageous.

The present invention is illustrated by the following examples.

EXAMPLES

Example 1

Preparation of an addition product (A) having a mean OH functionality of 1 and a mean NCO functionality of 2 from IPDI and trimethylolpropane 1000 g of IPDI were placed in a reaction vessel under a blanket of nitrogen and 300 g of TMP, dissolved in 1300 g of butyl acetate, were added with good stirring over a period of 1 minute. After introduction of 0.2 g of dibutyltin dilaurate, the reaction mixture was heated to 50° C., stirred at this temperature and the decrease in the NCO content was followed titrimetrically. When an NCO content of 7.3% by weight had been reached, the reaction product had a mean NCO functionality of 2 and a mean OH functionality of 1.

Example 2

Preparation of an addition product (A) having a mean OH functionality of 1 and a mean NCO functionality of 2 from IPDI isocyanurate and 1,3-butanediol 1000 g of IPDI isocyanurate were dissolved in 1000 g of ethyl acetate and, with good stirring, 136 g of 1,3-butanediol dissolved in 136 g of ethyl acetate were added over a period of 1 minute. After introduction of 0.4 g of dibutyltin dilaurate, the reaction mixture was stirred at 25° C. and the decrease in the NCO content was followed titrimetrically. When an NCO content of 5.4% by weight had been reached, the reaction product had a mean NCO functionality of 2 and a mean OH functionality of 1.

Example 3

Preparation of an addition product (A) having a mean OH functionality of 1 and a mean NCO functionality of 2 from 2,4-TDI and trimethylolpropane 1000 g of 2,4-TDI were placed in a reaction vessel under a blanket of nitrogen and 385 g of TMP, dissolved in 1385 g of butyl acetate, were added with good stirring over a period of 1 minute. After introduction of 0.1 g of dibutyltin dilaurate, the reaction mixture was stirred at 40° C. and the decrease in the NCO content was followed titrimetrically. When an NCO content of 8.7% by weight had been reached, the reaction product had a mean NCO functionality of 2 and a mean OH functionality of 1.

Example 4

Preparation of a polyaddition product (P) having a mean OH functionality of 1 and a mean NCO functionality of 3 from IPDI and glycerol 960 g of IPDI were placed in a reaction vessel under a blanket of nitrogen and a mixture of 1102 g of acetone and 58 g of DMAc was added. 200 g of glycerol was subsequently added dropwise with good stirring over a period of 1 minute. After introduction of 0.2 g of dibutyltin dilaurate, the reaction mixture was stirred firstly for 1 hour at room temperature and then at 40° C., and the decrease in the NCO content was followed titrimetrically. When an NCO content of 5.9% by weight had been reached, the reaction product had a mean NCO functionality of 3 and a mean OH functionality of 1.

Example 5

Preparation of a polyaddition product (P) having a mean OH functionality of 1 and a mean NCO functionality of 4 from IPDI and trimethylolpropane 1000 g of IPDI were placed in a reaction vessel under a blanket of nitrogen and 300 g of TMP, dissolved in 1300 g of butyl acetate, were added with good stirring over a period of 1 minute. After introduction of 0.2 g of dibutyltin dilaurate, the reaction mixture was stirred at 50° C. and the decrease in the NCO content was followed titrimetrically. When an NCO content of 4.8% by weight had been reached, the reaction product had a mean NCO functionality of 4 and a mean OH functionality of 1.

Example 6

Preparation of a polyaddition product (P) having a mean OH functionality of 1 and a mean NCO functionality of 10 from IPDI and trimethylolpropane 1000 g of IPDI were placed in a reaction vessel under a blanket of nitrogen and 300 g of TMP, dissolved in 1300 g of butyl acetate, were added with good stirring over a period of 1 minute. After introduction of 0.2 g of dibutyltin dilaurate, the reaction mixture was stirred at 50° C. and the decrease in the NCO content was followed titrimetrically. When an NCO content of 4.0% by weight had been reached, the reaction product had a mean NCO functionality of 10 and a mean OH functionality of 1.

Example 7

Preparation of an aliphatic polyisocyanate having a mean NCO functionality of 7.1

Immediately after the addition product from Example 1 had been prepared, 567 g of BASONAT HI 100 dissolved in 567 g of butyl acetate were added to it, the mixture was heated to 70° C. and stirred at this temperature for 3 hours. The end product had an NCO content of 5.7% by weight and a viscosity of 1300 mPas measured at 25° C. The mean molar mass of the polyisocyanate was 2696 g/mol and the mean functionality was 7.1.

Example 8

Preparation of an aliphatic polyisocyanate having a mean NCO functionality of 7.0

Immediately after the addition product from Example 1 had been prepared, 650 g of BASONAT HI 100 dissolved in 650 g of butyl acetate were added to it, the mixture was heated to 70° C. and stirred at this temperature for 3 hours. The end product had an NCO content of 5.9% by weight and a viscosity of 920 mPas measured at 25° C. The mean molar mass of the polyisocyanate was 2609 g/mol and the mean functionality was 7.0.

Example 9

Preparation of an aliphatic polyisocyanate having a mean NCO functionality of 6.7

Immediately after the addition product from Example 1 had been prepared, 867 g of BASONAT HI 100 dissolved in 867 g of butyl acetate were added to it, the mixture was heated to 70° C. and stirred at this temperature for 3 hours. The end product had an NCO content of 6.3% by weight and a viscosity of 300 mPas measured at 25° C. The mean molar mass of the polyisocyanate was 2313 g/mol and the mean functionality was 6.7.

Example 10

Preparation of an aliphatic polyisocyanate having a mean NCO functionality of 13.8

Immediately after the polyaddition product from Example 5 had been prepared, 286 g of BASONAT HI 100 dissolved in 286 g of butyl acetate were added to it, the mixture was heated to 70° C. and stirred at this temperature for 3 hours. The end product had an NCO content of 4.9% by weight and a viscosity of 9000 mPas measured at 25° C. The mean molar mass of the polyisocyanate was 6445 g/mol and the mean functionality was 13.8.

Example 11

Preparation of an aliphatic polyisocyanate having a mean NCO functionality of 5.4

Immediately after the addition product from Example 1 had been prepared, 640 g of BASONAT P LR 8926 dissolved in 640 g of butyl acetate were added to it, the mixture was heated to 70° C. and stirred at this temperature for 3 hours. The end product had an NCO content of 5.4% by weight and a viscosity of 230 mPas measured at 25° C. The mean molar mass of the polyisocyanate was 2111 g/mol and the mean functionality was 5.4.

Example 12

Preparation of an aliphatic polyisocyanate having a mean NCO functionality of 3.9

Immediately after the addition product from Example 1 had been prepared, 247 g of HDI dissolved in 247 g of butyl acetate were added to it, the mixture was heated to 70° C. and stirred at this temperature for 3 hours. The end product had an NCO content of 7.0% by weight and a viscosity of 120 mPas measured at 25° C. The mean molar mass of the polyisocyanate was 1279 g/mol and the mean functionality was 3.9.

Example 13

Preparation of an aliphatic polyisocyanate having a mean NCO functionality of 6.8

Immediately after the addition product from Example 2 had been prepared, 580 g of BASONAT HI 100 dissolved in 580 g of ethyl acetate were added to it, the mixture was heated to 40° C. and stirred at this temperature for 6 hours. The end product had an NCO content of 4.6% by weight and a viscosity of 300 mPas measured at 25° C. The product was subsequently freed of solvent and dried at room temperature under reduced pressure. The glass transition temperature ($T_g$) was determined as 66° C. by means of differential thermal analysis. The mean molar mass of the polyisocyanate was 3031 g/mol and the mean functionality was 6.8.

Example 14

Preparation of an aliphatic-aromatic polyisocyanate having a mean NCO functionality of 6.6

Immediately after the addition product from Example 3 had been prepared, 1100 g of BASONAT HI 100 dissolved in 1100 g of butyl acetate were added to it, the mixture was heated to 60° C. and stirred at this temperature for 3 hours. The end product had an NCO content of 7.4% by weight and a viscosity of 60 mPas measured at 25° C. The mean molar mass of the polyisocyanate was 2097 g/mol and the mean functionality was 6.6.

Example 15

Preparation of an aliphatic-aromatic polyisocyanate having a mean NCO functionality of 3.7

Immediately after the addition product from Example 1 had been prepared, 560 g of 4,4'-MDI dissolved in 560 g of butyl acetate were added to it, the mixture was heated to 60° C. and stirred at this temperature for 3 hours. The end product had an NCO content of 7.5% by weight and a viscosity of 100 mPas measured at 25° C. The mean molar mass of the polyisocyanate was 1233 g/mol and the mean functionality was 3.7.

Example 16

Preparation of an aromatic polyisocyanate having a mean NCO functionality of 4.4

Immediately after the addition product from Example 3 had been prepared, 780 g of LUPRANAT M 20 W dissolved in 780 g of butyl acetate were added to it, the mixture was heated to 60° C. and stirred at this temperature for 3 hours. The end product had an NCO content of 8.9% by weight and a viscosity of 30 mPas measured at 25° C. The mean molar mass of the polyisocyanate was 1277 g/mol and the mean functionality was 4.4.

Testing of the high-functionality polyisocyanates of the present invention as crosslinker components in polyurethane coating compositions Testing of the high-functionality polyisocyanates as hardeners in polyurethane coating systems The polyisocyanates of the present invention and also various polyisocyanate hardeners (BASONAT HI 100, BASF; VESTANAT IPDI T 1890, Degussa-Hüls) as comparisons were mixed with a mixture of hydroxy-functional acrylate resins (acrylate resin mixture 1) in the stoichiometric NCO/OH ratios and adjusted to an application viscosity of 20 s (DIN 53 211, cup with 4 mm outflow nozzle) by means of butyl acetate.

Coatings having a wet film thickness of 200 μm were applied to glass plates using a film casting instrument. The clear coatings obtained in this way were cured under standard conditions of temperature and humidity.

| Clear coating No. | 1 (comp.) | 2 (comp.) | 3 | 4 | 5 | 6 |
|---|---|---|---|---|---|---|
| Polyisocyanate hardener | Basonat HI 100 | Vestanat IPDI T1890 | Ex. 9 | Ex. 10 | Ex. 7 | Ex. 8 |
| Acrylate resin | Acrylate resin mixture 1 | | | | | |
| Properties of the coating | | | | | | |
| Days | Pendulum damping increase at room temperature [oscillations] | | | | | |
| 0 | 0 | 0 | 0 | 0 | 0 | 0 |
| 0.2 | 3 | 13 | 21 | 38 | 25 | 15 |
| 1 | 62 | 73 | 84 | 86 | 85 | 84 |
| 7 | 122 | 127 | 125 | 133 | 130 | 126 |
| 7 days at 23° C. + 15 h at 60° C. | 123 | 125 | 136 | 141 | 145 | 141 |
| Hardness testing using the Fischer scope The coating compositions are applied to gradient oven sheets using a film casting instrument (wet film thickness: 200μ), allowed to dry for 15 minutes and then baked at 140° C. for 23 minutes. | | | | | | |
| Fischer scope: Hardness HU [N/mm$^2$] | 189 | 259 | 269 | 284 | 270 | 266 |

Acrylate resin mixture 1: LUMITOL H 136 and LUMITOL M 100, mixing ratio = 4:6

The mixture has a solids content of 64% and an OH number of 116 mg KOH/g.

The clear coatings 3-6 with the high-functionality polyisocyanates of the present invention as hardeners have significantly improved curing properties and final hardnesses compared to the comparative experiments 1 and 2.

Testing of mixtures of standard isocyanate hardeners and the high-functionality polyisocyanates of the present invention in polyurethane coating systems Mixed hardeners were prepared from polyisocyanates according to the present invention and an HDI polyisocyanate (BASONAT HI 100) in various ratios, and these were mixed with the acrylate resin mixture 1 in the stoichiometric NCO/OH ratios and adjusted to an application viscosity of 20 s (DIN 53 211, cup with 4 mm outflow nozzle) by means of butyl acetate.

For comparison, clear coatings based on a mixed hardener VESTANAT IPDI T 1890/BASONAT HI 100 were tested.

The coatings to be tested were applied in a wet film thickness of 200 μm to glass plates using a film casting instrument. The drying behavior of the clear coatings obtained in this way was tested under standard conditions of temperature and humidity.

| Clear coating No. | 7 | 8 | 9 | 10 | 11 | 12 | 13 | 14 | 15 |
|---|---|---|---|---|---|---|---|---|---|
| Mixed hardener | Basonat HI 100 | Vestanat IPDI T 1890 L | | | | Polyisocyanate from Example 9 | | | |
| % of isocyanate (solid) | 0 | 33 | 50 | 75 | 100 | 33 | 50 | 75 | 100 |
| % of Basonat HI 100 (solid) | 100 | 67 | 50 | 25 | 0 | 67 | 50 | 25 | 0 |
| Acrylate resin | Acrylate resin mixture 1 | | | | | | | | |
| Properties of the coating | | | | | | | | | |
| Sand drying [h] | 4.0 | 3.5 | 2.8 | 2.2 | 1.0 | 2.3 | 1.9 | 1.5 | 1.0 |
| Complete drying [h] | 4.5 | 5.0 | 5.0 | 8.0 | 8.5 | 3.5 | 3.5 | 4.5 | 5.0 |

Hardness testing using the Fischer scope
The coatings are applied to gradient oven sheets using a film casting instrument (wet film thickness 200μ), allowed to dry for 15 minutes and then baked at 140° C. for 23 minutes.

| Fischer scope: Hardness HU [N/mm$^2$] | 189 | 201 | 217 | 224 | 259 | 213 | 230 | 246 | 269 |
|---|---|---|---|---|---|---|---|---|---|

The clear coatings with the hardeners 12-15 have significantly improved drying properties and hardnesses compared to the coatings from the comparative experiments 7-11.

LUMITOL® H 136, BASF: Solids content=70%, OH number=135 mg KOH/g.

LUMITOL® M 100, BASF: Solids content=60%, OH number=100 mg KOH/g, specifically suitable for IPDI hardeners.

BASONAT® HI 100, BASF: HDI polyisocyanate, viscosity about 3200 mPas, solids content=100%, NCO content=22% by weight.

BASONAT® P LR 8926, BASF: HDI polyisocyanate, viscosity about 350 mPas, solids content=100%, NCO content=19.5% by weight.

VESTANAT® IPDI T 1890, Degussa-Hüls: IPDI isocyanurate, solids content=70%, NCO content=12% by weight.

LUPRANAT® M 20 W, BASF: Polymeric MDI, viscosity about 200 mPas, solids content=100%, NCO content=31% by weight.

We claim:

1. A process for preparing high-functionality polyisocyanates having at least three free isocyanate groups, which comprises
   (i) preparation of an addition product (A) which contains only one group which is reactive toward isocyanate and at least two free isocyanate groups by reacting
      (a) a diisocyanate or polyisocyanate I with
      (b1) compounds having at least three groups which are reactive toward isocyanate or
      (b2) compounds containing two groups which are reactive toward isocyanate or mixtures of (b1) and (b2),
   where the diisocyanate or polyisocyanate I used is tetramethylene diisocyanate, tetramethylene diisocyanate trimer, hexamethylene diisocyanate, hexamethylene diisocyanate trimer, dodecyl diisocyanate, isophorone diisocyanate trimer, 4-isocyanatomethyloctamethylene 1,8-diisocyanate, diphenylmethane 4,4'-diisocyanate or a mixture thereof, and component (b) has functional groups having differing reactivities toward the functional groups of the other component and the reaction ratio is selected so that the addition product (A) contains an average of only one group which is reactive toward isocyanate, and at least two free isocyanate groups,
   (ii) optionally, intermolecular addition reaction of the addition product (A) to form a polyaddition product (P) containing an average of only one group which is reactive toward isocyanate and an average of more than two free isocyanate groups, and
   (iii) reaction of the isocyanate reactive group of said addition product (A) and/or the polyaddition product (P) with a diisocyanate or polyisocyanate II to form a high-functionality polyisocyanate having at least three free isocyanate groups and no free isocyanate reactive groups.

2. A process as claimed in claim 1, wherein the diisocyanate or polyisocyanate I is different from the diisocyanate or polyisocyanate II.

3. A process as claimed in claim 1, wherein the diisocyanate or polyisocyanate II comprises tolylene 2,4-diisocyanate, tolylene 2,6-diisocyanate, diphenylmethane 4,4'-diisocyanate, diphenylmethane 2,4'-diisocyanate, polymeric diphenylmethane diisocyanate, naphthylene 1,5-diisocyanate, tolidine diisocyanate, phenylene 1,3- and 1,4-diisocyanate, triisocyanatotoluene, biphenyl diisocyanate, tetramethylene diisocyanate, hexamethylene diisocyanate, dodecyl diisocyanate, lysine alkyl ester diisocyanate, where alkyl is $C_1$-$C_{10}$-alkyl, isophorone diisocyanate, 2-methylpentamethylene diisocyanate, 2,2,4- or 2,4,4-trimethylhexamethylene 1,6-diisocyanate, 1,3-diisocyanatocyclohexane, 1,4-diisocyanatocyclohexane, 3(4)-isocyanatomethyl-1-methyl-1-isocyanatocyclohexane, 2-butyl-2-ethylpentamethylene diisocyanate, 4-isocyanatomethyloctamethylene 1,8-diisocyanate, 2-isocyanatopropylcyclohexyl isocyanate, 2-methylcyclohexane 1,3-diisocyanate, 4-methylcyclohexane 1,3-diisocyanate, dicyclohexylmethane 4,4'-diisocyanate, dicyclohexylmethane 2,4'-diisocyanate, 1,3-bis(isocyanatomethyl) cyclohexane, 1,4-bis(isocyanatomethyl) cyclohexane, xylylene diisocyanate, tetramethylxylylene diisocyanate and isocyanates prepared from the isocyanates listed by coupling by means of urethane, allophanate, urea, biuret, uretdione, amide, isocyanurate, carbodiimide, uretonimine, oxadiazinetrione or iminooxadiazinedione structures, or mixtures thereof.

4. A process as claimed in claim 1, wherein, in the reaction of the addition product (A) and/or the polyaddition product (P) with the diisocyanate or polyisocyanate II, the ratio of isocyanate groups of the diisocyanate or polyisocyanate II to the isocyanate-reactive groups of the addition product (A) and/or the polyaddition product (P) is selected so that at least 10% of the NCO groups of the diisocyanate or polyisocyanate II are reacted.

5. A process as claimed in claim 1, wherein the isocyanate-reactive groups of the components (b1) and/or (b2) are selected from hydroxyl groups, mercapto groups, amino groups and mixtures thereof.

6. A process as claimed in claim 1, wherein the diisocyanate or polyisocyanate II used is hexamethylene diisocyanate, a hexamethylene diisocyanate oligomer containing isocyanurate, uretdione, urethane, allophanate, iminooxadiazinedione, or biuret groups, diphenylmethane 4,4'-diisocyanate, diphenylmethane 2,4'-diisocyanate, a mixture of diphenylmethane diisocyanates and polymeric diphenylmethane diisocyanate or a mixture of the isocyanates listed.

7. A process as claimed in claim 1, wherein the compounds (b1) having groups which are reactive toward isocyanate are glycerol, trimethylolmethane, trimethylolethane, trimethylolpropane, 1,2,4-butanetriol, tris(hydroxymethyl) aminomethane, tris(hydroxyethyl) aminomethane, 2-amino-1,3-propanediol, 2-amino-2-methyl-1,3-propanediol, diethanolamine, dipropanolamine, diisopropanolamine, ethanolpropanolamine, bis(aminoethyl) amine, bis(aminopropyl) amine, bis(trimethylolpropane), or polyesterols and the compounds (b2) used are 1,2-butanediol, 1,3-butanediol, 1,2-pentanediol, 1,3-pentanediol, propane-1,2-dithiol, butane-1,2-dithiol, mercaptoethanol, mercaptopropanol, mercaptobutanol, tolylenediamine, isophoronediamine, cysteamine, ethanolamine, N-methylethanolamine, propanolamine, isopropanolamine, 2-(butylamino) ethanol, 2-(cyclohexylamino) ethanol, 2-amino-1-butanol, 2-(2'-aminoethoxy) ethanol, hydroxypiperidine, 1-hydroxyethylpiperazine, aminopropanethiol.

8. A high-functionality polyisocyanate, prepared as claimed in claim 1.

9. A high-functionality polyisocyanate prepared as claimed in claim 1 and which has both aliphatically bound and aromatically bound isocyanate groups.

10. A paint, a varnish, a coating, an adhesive, a sealant, a pourable elastomer, or a foam comprising a high functionality polyisocyanate prepared as claimed in claim 1.

11. A polyaddition product obtained using a high-functionality polyisocyanate as claimed in claim 8.

* * * * *